Sept. 14, 1948.  B. WALKER  2,449,155
SPEED AND ODOMETER INDICATING DEVICE
Filed Feb. 5, 1944
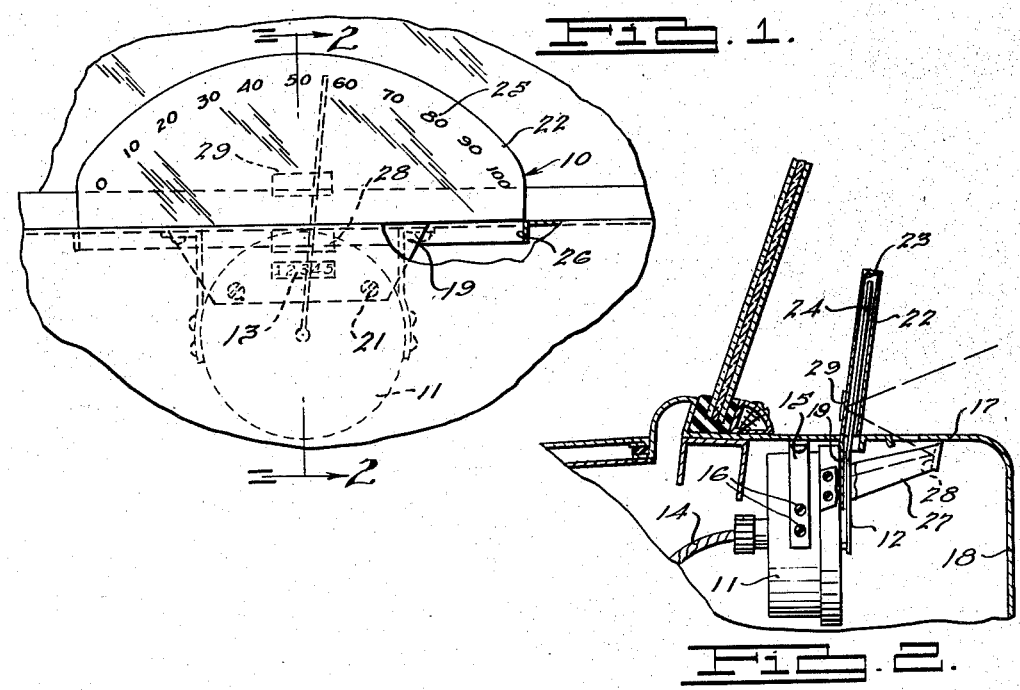
INVENTOR.
Brooks Walker
BY
Harness, Dickey & Pierce
ATTORNEYS.

Patented Sept. 14, 1948

2,449,155

UNITED STATES PATENT OFFICE 2,449,155

SPEED AND ODOMETER INDICATING DEVICE

Brooks Walker, Arlington, Va.

Application February 5, 1944, Serial No. 521,218

1 Claim. (Cl. 116—114)

This invention relates to indicating devices and particularly to indicating means projected into the vision of a driver of a vehicle for apprising the driver of the speed or other operating characteristic of the vehicle without changing the focus of the eyes.

While it is not new in the art to project a dial and an indicating hand into the vision of the operator of a vehicle, the present invention contemplates the provision of an indicating device and dial which is mounted beneath and rearwardly of the vehicle dash panel in such manner as to have certain indications disposed in the line of vision of the operator while others are made available through one or more apertures in the panel. While various indicating devices may be mounted in this manner, for the purpose of illustration, the drawing discloses a speedometer having an odometer operated in combination therewith.

The dial for indicating the speed of the vehicle projects upwardly through an aperture in the dash panel in the rear of the windshield, to be substantially in the direct vision of the operator. The odometer reading is visible through the casing of the operating mechanism and this is transferred by mirrors to the vision of the operator.

Accordingly, the main objects of this invention are; to provide an indicating device mounted below and behind the dash panel having a plurality of indicating means projected thereabove; to provide a speedometer below and behind a dash panel having the speed indicating dial projected thereabove and with means provided for observing the odometer readings on the face of the mechanism; and in general, to provide a speedometer as a unit element having a dial indicator which projects upwardly from the dash panel and a system of mirrors which transfers the odometer readings of the speedometer above the panel.

Other objects and features of novelty of the invention will be either specifically pointed out or will become apparent when referring, for a better understanding of the invention, to the following description, taken in conjunction with the accompanying drawing, wherein;

Fig. 1 is a broken view in elevation of a speedometer attachment for a vehicle embodying features of this invention, and Fig. 2 is a sectional view of the structure illustrated in Fig. 1, taken on the line 2—2 thereof.

Referring to Figs. 1 and 2, a speedometer 10 is illustrated as a unit element embodying a casing 11 containing the driving mechanism for an indicating hand 12, and for an odometer, the readings of which are visible through the window 13. The driving mechanism within the casing 11 is of conventional form and is not herein described in detail. The mechanism is driven through a flexible cable 14 from an operating part of the vehicle. The casing 11 is secured to a bracket 15 by a plurality of screws 16 beneath the top portion 17 of a dash panel which extends downwardly into a front vertical portion 18. A plate 19 is secured to the front face of the casing 11 by screws 21 for supporting an indicating dial 22, the plate being a portion of the dial, as illustrated, or may be a separate element attached thereto.

The indicating dial is of arcuate shape and made of transparent material, having a hollow interior 23 in which the upper end 24 of the indicating hand 12 moves as the speedometer is operated. Dial readings 25 are provided on the indicating dial 22 disposed in the path of movement on the end 24 of the indicating hand. The indicating dial projects through an aperture 26 in the top portion 17 of the dash panel, to be disposed substantially in the line of vision of the vehicle operator.

A frontwardly extending bracket 27 is attached to the casing 11 for supporting a mirror 28 frontwardly of the window 13 for deflecting the odometer readings onto a mirror 29 provided on the indicating dial 22. The mirror 29 will reflect the odometer readings from the mirror 28 into the field of vision of the vehicle operator. With this construction, both the speedometer reading and the odometer reading are disposed within the vision of the operator when the operator is viewing the road ahead, and the mechanism for driving the speedometer and odometer is disposed beneath and behind the dash panel.

What is claimed is:

In a vehicle body having a windshield from which a panel extends rearwardly and downwardly within the body, a speed indicating and odometer device supported beneath and forward of said panel in spaced relation thereto, an indicating hand extending from said speedometer, a transparent element containing dial indications enclosing said hand and attached to said device and projecting through an opening in the rearwardly extending portion of said panel into the vicinity of said windshield, a mirror on said element, and a second mirror supported on said device for transferring the reading of said odometer through an opening in said panel to the mirror on said element.

BROOKS WALKER.

REFERENCES CITED

The following references are of record in the file of this patent:

UNITED STATES PATENTS

| Number | Name | Date |
|---|---|---|
| 1,871,877 | Buckman | Aug. 16, 1932 |
| 1,999,429 | Tibbetts | Apr. 30, 1935 |
| 2,264,044 | Lee | Nov. 25, 1941 |

FOREIGN PATENTS

| Number | Country | Date |
|---|---|---|
| 767,157 | France | Jan. 16, 1934 |